United States Patent
Anand et al.

(10) Patent No.: US 8,380,787 B2
(45) Date of Patent: Feb. 19, 2013

(54) FEDERATION OF MASTER DATA MANAGEMENT SYSTEMS

(75) Inventors: Rangachari Anand, Teaneck, NJ (US); Stacy F. Hobson, Poughkeepsie, NY (US); Juhnyoung Lee, Yorktown Heights, NY (US); Xuan Liu, Yorktown Heights, NY (US); Bin Wang, Beijing (CN); Yuan Wang, Beijing (CN); Jing Min Xu, Beijing (CN); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/117,321

(22) Filed: May 27, 2011

(65) Prior Publication Data

US 2012/0303692 A1 Nov. 29, 2012

(51) Int. Cl.
*G06F 9/00* (2006.01)
(52) U.S. Cl. ......... 709/203; 709/220; 707/602; 707/971
(58) Field of Classification Search .................. 709/203, 709/220, 229; 707/602, 971
See application file for complete search history.

(56) References Cited

U.S. PATENT DOCUMENTS

| | | | |
|---|---|---|---|
| 5,550,971 A | 8/1996 | Brunner et al. | |
| 5,590,326 A | 12/1996 | Manabe | |
| 5,649,102 A | 7/1997 | Yamauchi et al. | |
| 5,872,850 A | 2/1999 | Klein et al. | |
| 6,064,968 A | 5/2000 | Schanz | |
| 6,256,676 B1 | 7/2001 | Taylor et al. | |
| 6,327,594 B1 | 12/2001 | Van Huben et al. | |
| 6,591,265 B1 | 7/2003 | Erickson et al. | |
| 6,738,975 B1 | 5/2004 | Yee et al. | |
| 6,779,184 B1 | 8/2004 | Puri | |
| 7,114,146 B2 | 9/2006 | Zhang et al. | |
| 7,131,057 B1 | 10/2006 | Ferrucci et al. | |
| 7,213,037 B2 | 5/2007 | Rangadass | |
| 7,237,225 B2 | 6/2007 | Kompalli et al. | |
| 7,293,010 B2 | 11/2007 | Angele et al. | |
| 7,305,392 B1 | 12/2007 | Abrams | |
| 7,509,326 B2 | 3/2009 | Krabel et al. | |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,647 B2 | 11/2009 | Stephens et al. | |
| 7,620,980 B1 | 11/2009 | Wood et al. | |
| 7,631,089 B2 | 12/2009 | Knauerhase et al. | |
| 7,725,429 B2 | 5/2010 | Rangadass et al. | |
| 7,895,445 B1 | 2/2011 | Albanese | |
| 7,987,152 B1 * | 7/2011 | Gadir | 707/602 |
| 8,224,873 B1 * | 7/2012 | Korablev et al. | 707/809 |
| 2003/0137539 A1 | 7/2003 | Dees | |

(Continued)

OTHER PUBLICATIONS

Deep Secure, The Deep-Secure Mail Guard Applies Policy Enforcement and Content Checking to Email, Deep Secure Mail Guard Information and Fact Sheet, 2010.

(Continued)

*Primary Examiner* — Khanh Dinh
(74) *Attorney, Agent, or Firm* — Scully, Scott, Murphy & Presser, P.C.; William Stock, Esq.

(57) ABSTRACT

Federating master data management systems may include a network-aware adapter configured with a host master data management node. The network-aware adapter may establish one or more links with other master data management systems to allow the system to work together and leverage each other's data.

25 Claims, 13 Drawing Sheets

U.S. PATENT DOCUMENTS

| | | | |
|---|---|---|---|
| 2004/0103103 | A1 | 5/2004 | Kalthoff et al. |
| 2005/0055556 | A1 | 3/2005 | Shiu et al. |
| 2006/0101096 | A1 | 5/2006 | Fuerst |
| 2006/0259923 | A1 | 11/2006 | Chiu |
| 2006/0287890 | A1 | 12/2006 | Stead |
| 2007/0220035 | A1 | 9/2007 | Misovski |
| 2007/0220588 | A1 | 9/2007 | Panda et al. |
| 2007/0233539 | A1* | 10/2007 | Suenderhauf et al. ............ 705/8 |
| 2007/0239858 | A1 | 10/2007 | Banerji et al. |
| 2007/0282748 | A1 | 12/2007 | Saint Clair |
| 2008/0052310 | A1 | 2/2008 | Rangadass |
| 2008/0059543 | A1 | 3/2008 | Engel |
| 2008/0256467 | A1 | 10/2008 | Chu |
| 2008/0270363 | A1* | 10/2008 | Hunt et al. ........................ 707/3 |
| 2009/0099852 | A1 | 4/2009 | Ouimet |
| 2010/0030623 | A1 | 2/2010 | Guglani |
| 2010/0042641 | A1 | 2/2010 | Kamalakantha et al. |
| 2010/0122155 | A1 | 5/2010 | Monsarrat |
| 2010/0218167 | A1 | 8/2010 | Turner et al. |
| 2011/0010759 | A1 | 1/2011 | Adler |
| 2011/0025707 | A1 | 2/2011 | Fujioka |
| 2011/0047597 | A1 | 2/2011 | Mahaffey |
| 2011/0078243 | A1 | 3/2011 | Carpenter |
| 2012/0239699 | A1* | 9/2012 | Anand et al. ................. 707/792 |

OTHER PUBLICATIONS

Anca Andreescu et al., "Combining Actual Trends in Software Systems for Business Management," Internation Conference on Computer Systems and Technologies, Jun. 12-13, 2008.

Allen Drelbelbis et al., "Enterprise Master Data Management, An SOA Approach to Managing Core Information," IBM Press, Pearson plc, Upper Saddle River, NJ.

Jean-Sebastier Brunner et al., Explorations in the Use of Semantic Web Technologies for Product Information Management, May 8-12, 2007, Banff, Alberta, Canada.

Michael Franklin et al., "From Databases to Dataspaces: A New Abstraction for Information Management," Sigmod Record, 34(4):27-33, 2005.

Loser, et al., Master Data Management for Collaborative Service Processes, International Conference on Service Systems and Service Management, Beijing, China, 2004.

Ullman, Information integration using logical views, Theoretical Computer Science—Special issue on the 6th International Conf. on DB Theory—ICDT, vol. 239 Is. 2, May 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30 Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8 Issue 6, Nov. 2004.

Benatallah, et al., The Self-Serv environment for Web services composition, IEEE Internet Computing, vol. 7, Issue 1, Jan./Feb. 2003.

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences—Part I, 2001.

Modahl, et al., MediaBroker: An Architecture for Pervasive Computing, PERCOM '04 Proceedings of the 2nd IEEE IntntnI Conf. on Pervasive Computing and Communications, 2004.

Mouhib Alnoukari, Applying Adaptive Software Development (ASD) Agile Modeling on Predictive Data Mining Applications: ASD-DM Methodology, Int. Symposium on Info. Tech., 2008.

Cervantes, et al, A Framework for Constructing Adaptive Component-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 1.1 2006.

Jeff Kelly, New Online Marketplace Could Boost Data Integration Applications, DataManagement.com, Feb. 18, 200. http://searchdatamanagement.techtarget.com/news/1389686.

Turner, Turning Software into a Service, Computer, vol. 36 Issue 10, Oct. 2003.

* cited by examiner

FEDERATION OF MASTER DATA MANAGEMENT SYSTEMS

FIELD

The present application relates generally to computers and applications, and more particularly to master data management systems and federating the master data management systems.

BACKGROUND

Master data refers to facts that describe the core of entities, for example, an organization's employees, customers, suppliers, partners, organizations, products, materials, accounts, medical records, locations, and others. Such master data are of high value information that an organization uses repeatedly across many business processes. *Enterprise Master Data Management* by Allen Dreibelbis, Eberhard Hechler, Ivan Milman, Martin Oberhofer, Paul van Run and Dan Wolfson, IBM Press, 2008 provide background on master data management.

Managing master data faces challenges in that the data is usually scattered throughout the enterprise without consistent view of the master data. Fragmentation occurs as a result of the data being trapped inside enterprise resource planning (ERP), customer relationship management (CRM) and other commercially available off-the-shelf (COTS) packages. Factors such as mergers and acquisitions, experiments in new markets, decentralized businesses, and legal requirements across geographical boundaries also may contribute to fragmentation and inconsistency in master data.

Master data may be managed as objects and attributes, and by defining transactions over and access control to the objects and attributes. Data governance procedures may be also defined for functionalities such as conflict resolution, data import and data integration. An MDM system or server should ensure consistent master information across transactional and analytical systems, address key issues such as data quality and consistency proactively rather than "after the fact" in the data warehouse, decouple master information from individual applications, become a central, application independent resource, and simplify ongoing integration tasks and new app development. An MDM system can be implemented with different styles. For instance, in "consolidation" implementation style, data is periodically replicated to the MDM server. In "registry" implementation style, an MDM server knows where to find the data. In "transactional hub" implementation style, an MDM server becomes the system of record for master data. Applications should be appropriately architected to use this style of MDM implementation.

InfoSphere™ MDM is an MDM product from International Business Corporation (IBM), Armonk, N.Y. InfoSphere™ MDM product family includes Master Data Management Server with data model that include three domains (party, product, account), Master Information Hub that allows a user to make user's own domain and data models, and Master Data Manager for Product Information Management, which is a web-based collaborative authoring environment for a product domain in a data model. The party domain of the MDM Server manages the entirety of data related to parties such as customers, vendors, and suppliers, people and organization. The product domain of the MDM Server manages the definitions of products, category hierarchies, bundles, and equivalences. Its collection of products makes up a product catalog that is accessible throughout the enterprise. The account domain of the MDM Server manages business relationships and agreements with other parties, such as billing, claims and contracts. MDM functionalities include suspecting duplicate processing (also referred to as "data stewardship") that prevents inadvertent creation of duplicate parties and products, for instance, using matching techniques; managing history of data modifications (also referred to as "point-in-time history"), which includes a full audit database that contains the full modification histories of all data objects and a set of query options for the audit database; keeping track of the source of all data and when it was added (also referred to as "source value"); maintain links to documents stored in a Content Management System (CMS) (also referred to as "document attachments"); and allowing administrators to define what elements and sub-elements users and user groups can see based on defined constraints (also referred to as "rules of visibility").

To date, conventional use of master data management includes managing a single physical and logical MDM system for an entire enterprise, in which the scope of the applications and organizations of MDM is determined in the design stage. However, in many organizations, there may be requirements for multiple and multiple-level (hierarchical) MDM systems.

BRIEF SUMMARY

Federating master data management systems may be provided. A system for federating master data management systems, in one aspect, may include a network-aware adapter configured with a host master data management node, the network-aware adapter including at least. A network manager may be operable to maintain link information associated with the network-aware adapter and store master data management network information associated with the host master data management node. A transaction coordinator may be operable to coordinate distributed transaction between the host master data management node and one or more of second master data management systems. A transaction resource manager may be operable to interact with the host master data management node to commit or rollback a transaction. A reference change detector may be operable to detect a reference modification made in the host master data management node. A reference change sender may be operable to send a reference modification request to one or more of the second master data management systems. A reference change receiver may be operable to receive the reference modification request from one or more of the second master data management systems and populate the modification into the host master data management node. A master data request interceptor may be operable to intercept a master data read request made to the host master data management node. A master data request handler may be operable to forward the master data read request to one or more of the second master data management systems that are implemented in registry style, and receive in response returned master data from said one or more of the second master data management systems that are implemented in registry style node, and further forward the returned master data to a requestor.

A method of federating master data management systems, in one aspect, may include maintaining link information associated with a network-aware adapter and storing master data management network information associated with a host master data management node, and coordinating distributed transaction between the host master data management node and one or more of second master data management systems in a network of master data management systems. The may also include interacting with the host master data management node to commit or rollback a transaction, and detecting a reference modification made in the host master data management node. The method may further include sending a reference modification request to one or more of the second master data management systems, and receiving the reference modification request from one or more of the second master data management systems and populating the modification into the host master data management node. The method may yet further include intercepting a master data read request made to intercepting a master data read request made to the host master data management node, and forwarding the master data read request to one or more of the second master data management systems that are implemented in registry style, and receiving in response returned master data from said one or more of the second master data management systems that are implemented in registry style node, and further forwarding the returned master data to a requestor application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect provides for federation of master data management (MDM) systems, for instance, in organizations where there may be requirements for multiple and multiple-level (hierarchical) physical MDM systems. In one aspect of the present disclosure, a single logical MDM view is provided for the multiple and multiple-level physical MDM systems. The MDM systems may be established in the bottom-up manner, and the MDM functionalities may be ensured in this federated MDM environment.

The systems and/or methodologies of the present disclosure allows for adding, modifying, and/or removing an MDM, as needed or desired, in a platform (or network) containing a plurality of MDM systems, and federate it with the existing MDM systems to maintain a single logical MDM view in the platform. An example platform is a government data platform, for instance, operating on a municipal service cloud. In one aspect, the systems and/or methodologies of the present disclosure allows for defining the scope of the applications and organizations represented by the new MDM in view of existing MDM systems in the platform; leveraging (using) the existing MDM systems, which may be implemented in a different architectural style, to design and implement the new MDM system more efficiently; federating different (e.g., existing and new) MDM systems to make them work together and consolidate and share master data among different level of organizations and applications; handling different types of MDM addition, e.g., MDM system and a group MDM systems. At the same time, the systems and/or methodologies of the present disclosure may ensure MDM functionality (e.g., data stewardship, point-in-time-history, source value, document attachments, rules of visibility) to be performed properly in the federated MDM environment.

In one aspect, a methodology of the present disclosure may establish one or more links between new coming MDM system with existing MDM systems to make them work together and leverage each other's data. The methodology of the present disclosure in another aspect may manage the topology of MDM network and coordinate the MDM systems (also referred to as nodes) and links between them. Yet in another aspect, the methodology of the present disclosure may control the data flow in MDM network, while keeping with the MDM functionality such as data stewardship (suspect duplicate processing), point-in-time history, source value tracking, document attachments, and rules of visibility.

Figure 1:
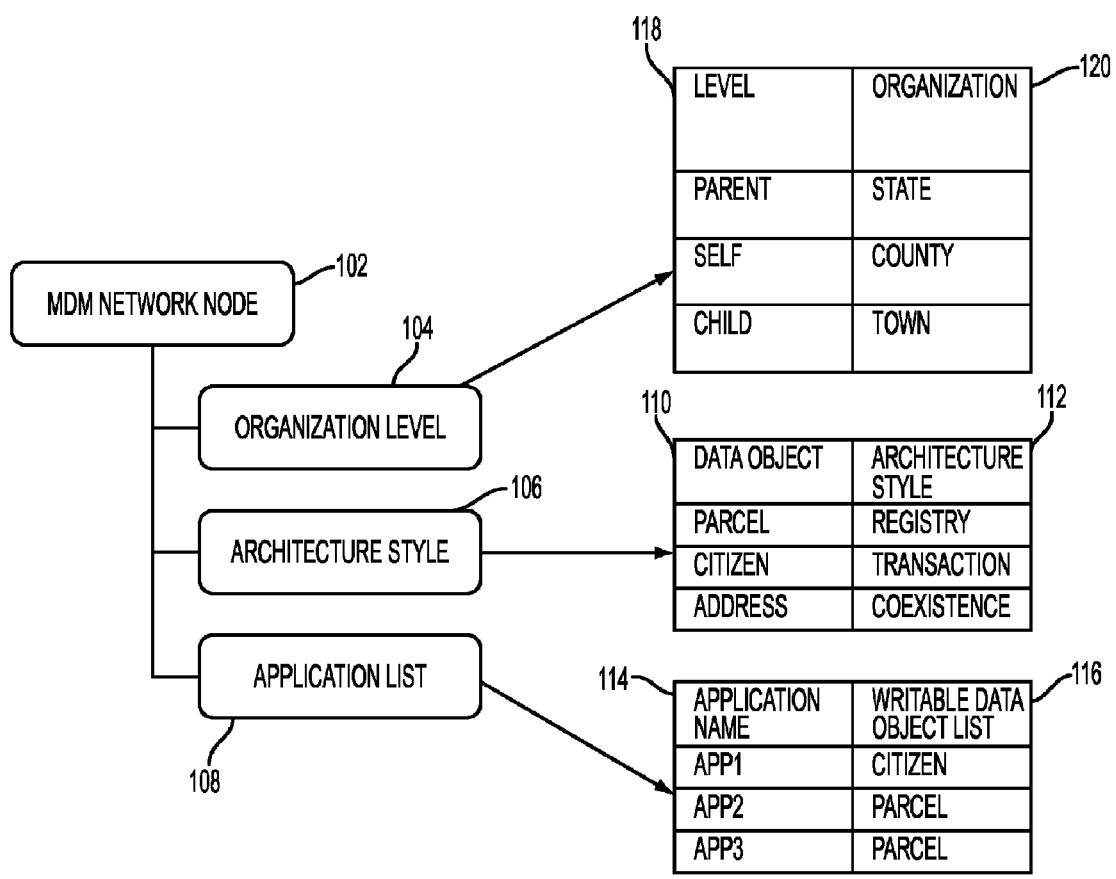
FIG. 1 illustrates an MDM network model in one embodiment of the present disclosure.

FIG. 1 illustrates an MDM network model in one embodiment of the present disclosure. The MDM network model represents an autonomous MDM system (also referred to as a node, or an MDM network node). An MDM network node 102 may be structured into different components: organization level 104, architecture style 106, and application list 108. Other structural definitions are possible. The organization level 104 may specify the levels 118 (e.g., parent, self, child) and names of the levels 120 (e.g., state, county, town). The MDM network node 102 manages data objects 110, which may be implemented with three possible MDM "architecture styles" as shown at 112. The MDM network node 102 also manages applications that access the data objects 110, for instance, via an application list 108. The application list 108 may include the names of the applications 114 and one or more objects those applications write to as shown at 116.

A link may be established between two autonomous MDM systems, for instance, between a server or application of one MDM system to another MDM system's server or application. A link is established, for example, by allowing an MDM to access another MDM's data. The model shown in FIG. 1 may be used to identify the architecture of a new MDM node and links that should be established between the new node and one or more existing nodes in order to leverage them. The model may be also used to define the scope of the applications and organizations involved in the new MDM.

Figure 2:
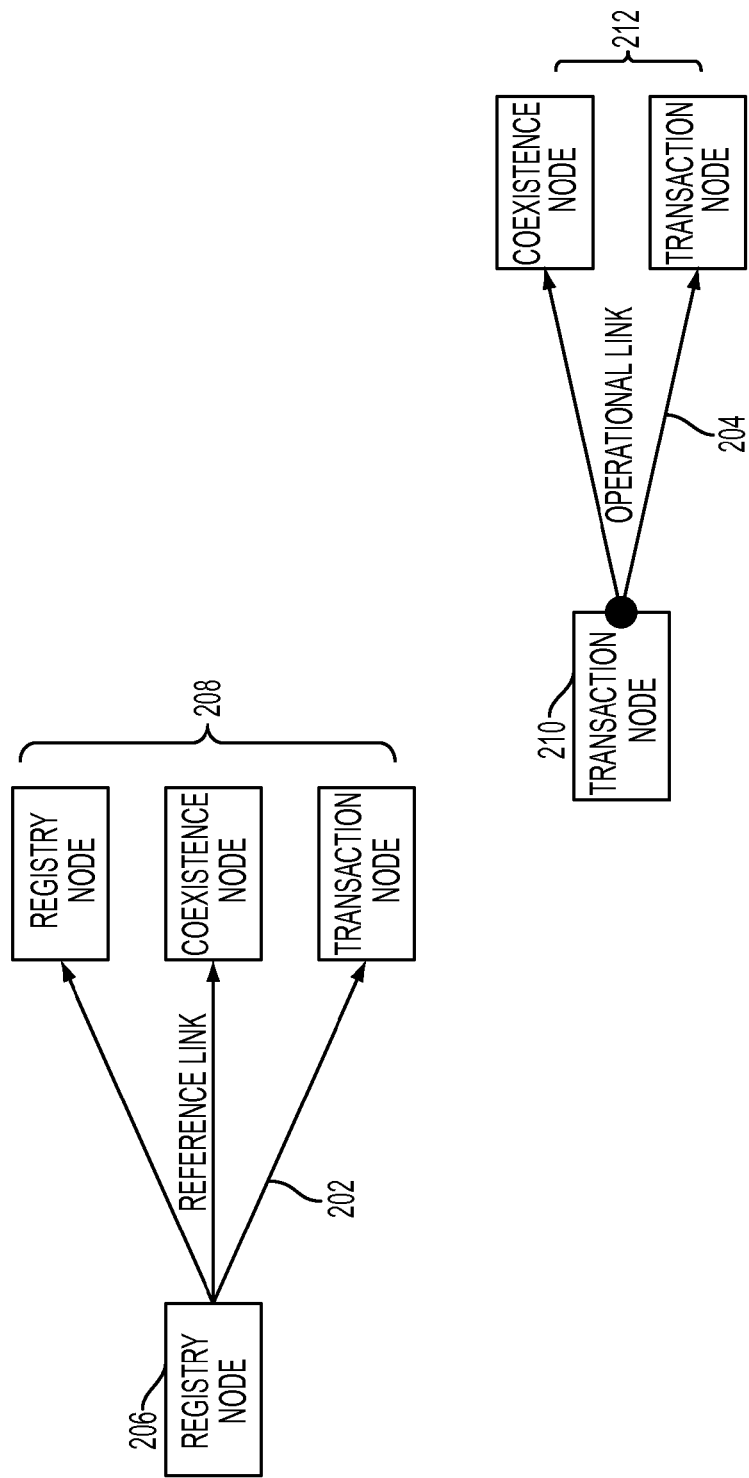
FIG. 2 shows different link types of a link in one embodiment of the present disclosure that may connect the autonomous MDM systems.

FIG. 2 shows different link types of a link in one embodiment of the present disclosure that may connect the autonomous MDM systems. As described above, data objects may be architected or implemented in different architectural style. Depending on the architectural style, different links may be established. For instance, if a data object of a node 206 is implemented as "registry" style, that node 206 accesses data by a reference link 202 from another node (which may be implemented in any of the shown styles, e.g., registry, transaction or co-existence) 208. Accessing data by reference refers to accessing it by address rather then by value. As another example, if a data object of a node 210 is implemented as "transactional hub" style (also shortened and referred to as "transaction" style), another node may access data from that node 210 by operation link 204 from another node (which may be implemented in transaction or co-existence style) 212. In operational link, the original transaction node 210 handles the distributed transaction committed to it.

In a traditional MDM system, a transaction style MDM system has all the data objects stored locally with an MDM server of the system, and when an application submits a read or write request to the MDM system, the MDM server manages the transaction. In a usage scenario (MDM network) of the present disclosure in one embodiment, a transaction style MDM system (210) does not own all the data locally, e.g., some data may be distributed among other MDM systems (212). Thus, when an application submits a read or write request to the MDM system 210 and if servicing this request includes accessing data from other MDM systems (210 and/or 212) in the network, the MDM system 210 (which initially received the request) performs a distributed query to the other MDM systems and manages the distributed transaction. In one embodiment of the present disclosure, an operational link 204 is established or exists between MDM nodes if the source MDM node of the link is implemented as a transaction style MDM system 210 and manages the distributed transaction between the source node 210 and the target node of the link 212.

In one embodiment of the present disclosure, an MDM system or node may be implemented in different architectural styles. For example, if an MDM system manages different data object types, the system could be implemented in different architectural styles according to the different data types. A MDM systems are implemented to improve the quality of master data and to provide consistent, managed use of this information in what is often a complex and somewhat tangled environment. There are a variety of ways to support these requirements, for instance, to accommodate a range of methods of use and implementation requirements. Implementation requirements may dictate if the MDM system is to be used as a system of record or system of references; if the system is to support operational environment, decision support environments, or both; if it is important for the MDM system to push clean data back into existing systems; and if geographic distribution is required. Different combinations of implementation and usage requirements may dictate different MDM implementation styles. Thus, hybrid implementations that combine multiple implementation style are possible.

Briefly, in "consolidation" implementation style of an MDM system, an individual application linked to the MDM system stores its own data, for instance, in its own database. The data is periodically replicated to the MDM server from each application's data. Thus, in this style, MDM server uses its own local copy of the data for operations.

The consolidation implementation style focuses on bringing together data from multiple sources for purposes of a central reference or reporting analysis. This can be compared to a typical data warehouse. The data collected is not used to update other systems. The system of record of the data belongs to the individual source systems. The consolidation implementation style brings together master data from a variety of existing systems, both database and application systems, into a single managed MDM hub. Along the way, the data is transformed, cleansed, matched, and integrated in order to provide a complete "golden" record for one or more master data domains. This golden record serves as a trusted source to downstream systems for reporting and analytics, or as a system of reference to other operational applications. Changes to the data primarily come in from the systems that feed it; this is a read-only system. The basic consolidation style has reads and writes going directly against the existing systems and the MDM system receiving updates from these existing systems. The integrated and cleansed information is then distributed to downstream systems (such as data warehouses) that use, but do not update, the master data.

In "registry" implementation style of an MDM system, an individual application linked to the MDM system stores its own data, for instance, in its own database. The MDM system accesses the data in the individual application's database, by reference, and does not operate on a local copy. For example, the MDM system may store references to the data physically stored in the individual application's database. Virtual consolidated view is assembled dynamically and is often read-only. Authoring remains distributed.

The registry style creates a skeleton record with minimum amount of data required to identify the master record and to facilitate the linking of accounts across multiple source systems. The data collected is not used to update other systems. The system of record of the data belongs to the individual source systems. The registry implementation style can be useful for providing a read-only source of master data as a reference to downstream systems with a minimum of data redundancy. The outside systems are existing sources of master data. The MDM system holds the minimum amount of information required to uniquely identify a master data record; it also provides cross-references to detailed information that is managed within other systems and databases. The registry style implementation is able to clean and match this identifying information and assumes that the source systems are able to adequately manage the quality of their own data. A registry style of MDM implementation serves as a read-only system of reference to other applications. Queries against the registry style MDM system dynamically assemble the required information in two steps. First, the identifying information is looked up within the MDM system. Then, using that identity and the cross-reference information, relevant pieces of information are retrieved from other source systems.

In "coexistence" implementation style of an MDM system, the MDM system physically stores consolidated view of master data.

The coexistence style implements all the features of the registry style, and also provides data elements that the client wants to track at the party level. Master data can be updated in source systems or in MDM Server, in which case the data is fed back to source systems. IBM® InfoSphere™ Rapid Deployment Package (RDP) for Master Data Management (MDM) facilitates the process of feeding an MDM server with master data from source systems in batch fashion. The coexistence style may be considered as being one step closer than the Registry style to becoming the system of record, but the existing source systems still remain as the system of record.

The coexistence style of MDM implementation involves master data that may be authored and stored in numerous locations and that includes a physically instantiated golden record in the MDM system that is synchronized with source systems. The golden record may be constructed in the same manner as the consolidation style, e.g., through batch imports, and can be both queried and updated within the MDM system. Updates to the master data can be fed back to source systems as well as published to downstream systems. In a coexistence style, the MDM system can interact with other applications or users.

An MDM system implemented in the coexistence style is not a system of record, because it is not the single place where master data is authored and updated. It is a participant in a loosely distributed environment that can serve as an authoritative source of master data to other applications and systems. Because the master data is physically instantiated within the MDM system, the quality of the data can be managed as the data is imported into the MDM system.

The transaction hub style implements centralized management of master data. All data updates happen directly in the MDM system and can be distributed to other applications and MDM systems in MDM network, which implement read-only access. The MDM repository becomes the system of record for master data. The transactional hub implementation style provides a centralized, complete set of master data for one or more domains. It is a system of record, serving as the single version of the master data it manages. A transactional hub is part of the operational fabric of an information technology (IT) environment, receiving and responding to requests in a timely manner. This style often evolves from the consolidation and coexistence implementations. The fundamental difference is the change from a system of reference to a system of record. As a system of record, updates to master data happen directly to this system using the services provided by the hub that is the MDM system. As update transactions take place, the master data is cleansed, matched, and augmented in order to maintain the quality of the master data. After updates are accepted, the system distributes these changes to interested applications and users. Changes can be distributed as they happen via messaging, or the changes can be aggregated and distributed as a batch.

Figure 3:
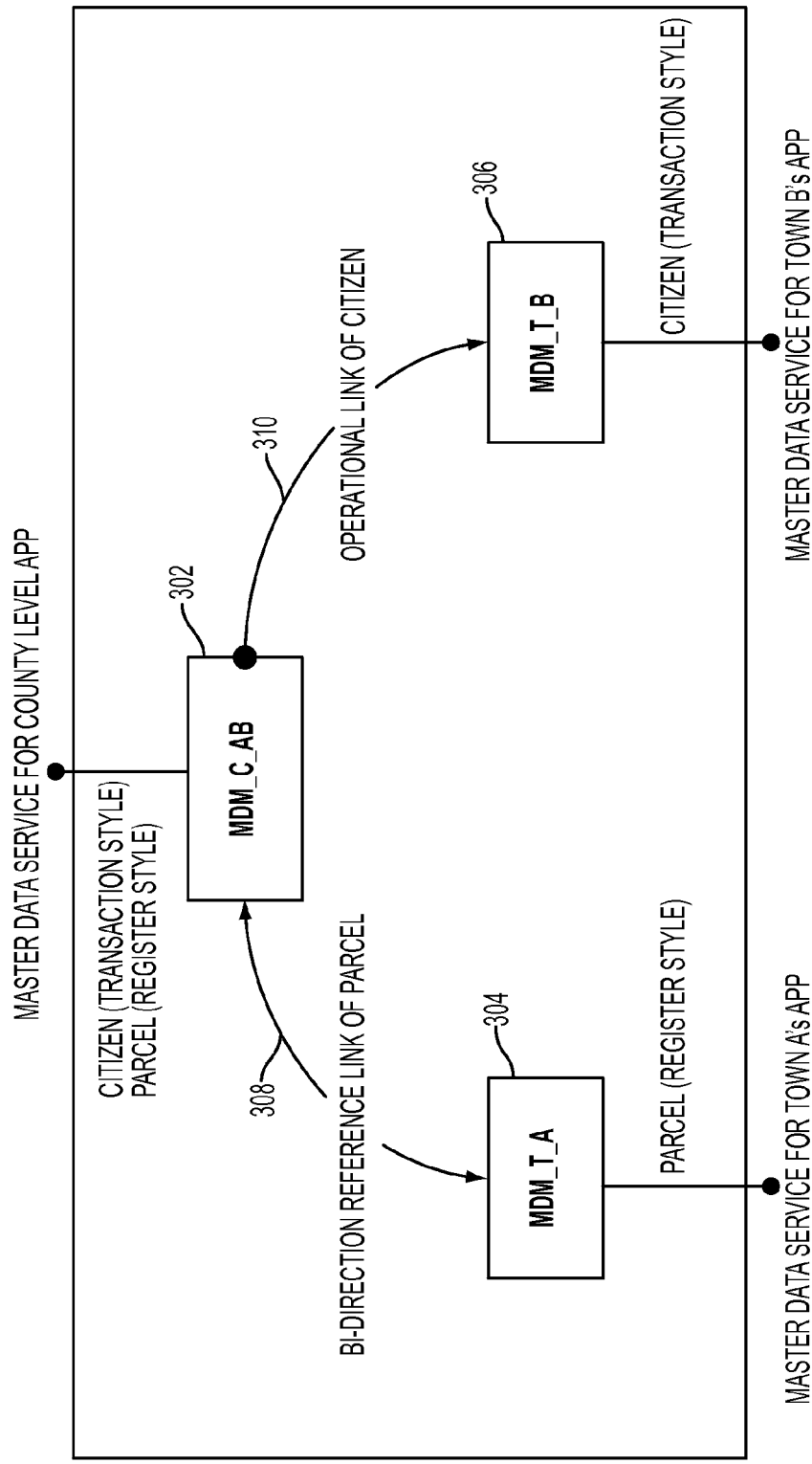
FIG. 3 is an architectural diagram showing a plurality of MDM systems and links according to one embodiment of the present disclosure.

FIG. 3 is an architectural diagram showing a plurality of MDM systems and links according to one embodiment of the present disclosure. In the example shown, there are three organizations that are hierarchically related. For instance, the organizations may be government organizations. A county-level organization may have its own MDM system 302. Applications running on this county-level organization's computer systems (or information technology (IT) systems) may access or use the services of the MDM system 302. At a lower level of the organization hierarchy, there may be town-level organizations, each with its own MDM system 304 and 306. Applications running on the respective town-level organization's computer systems (or information technology (IT) systems) may access or use the services of the respective MDM systems 304 and 306. In one embodiment of the present disclosure, an application of the county-level organization may want to access the data maintained by an MDM system 304 of a town, e.g., a data object describing a parcel, which the MDM system 304 has implemented in registry style. The application for the county-level organization may access this data via its MDM system 302 by a reference link 308. Similarly, the application of the county-level organization may want to access the data maintained by an MDM system 306 of another town, e.g., a data object describing a citizen, which the MDM system 306 has implemented in transaction style. The application for the county-level organization may access this data via its MDM system 302 by an operational link 310.

Figure 4:
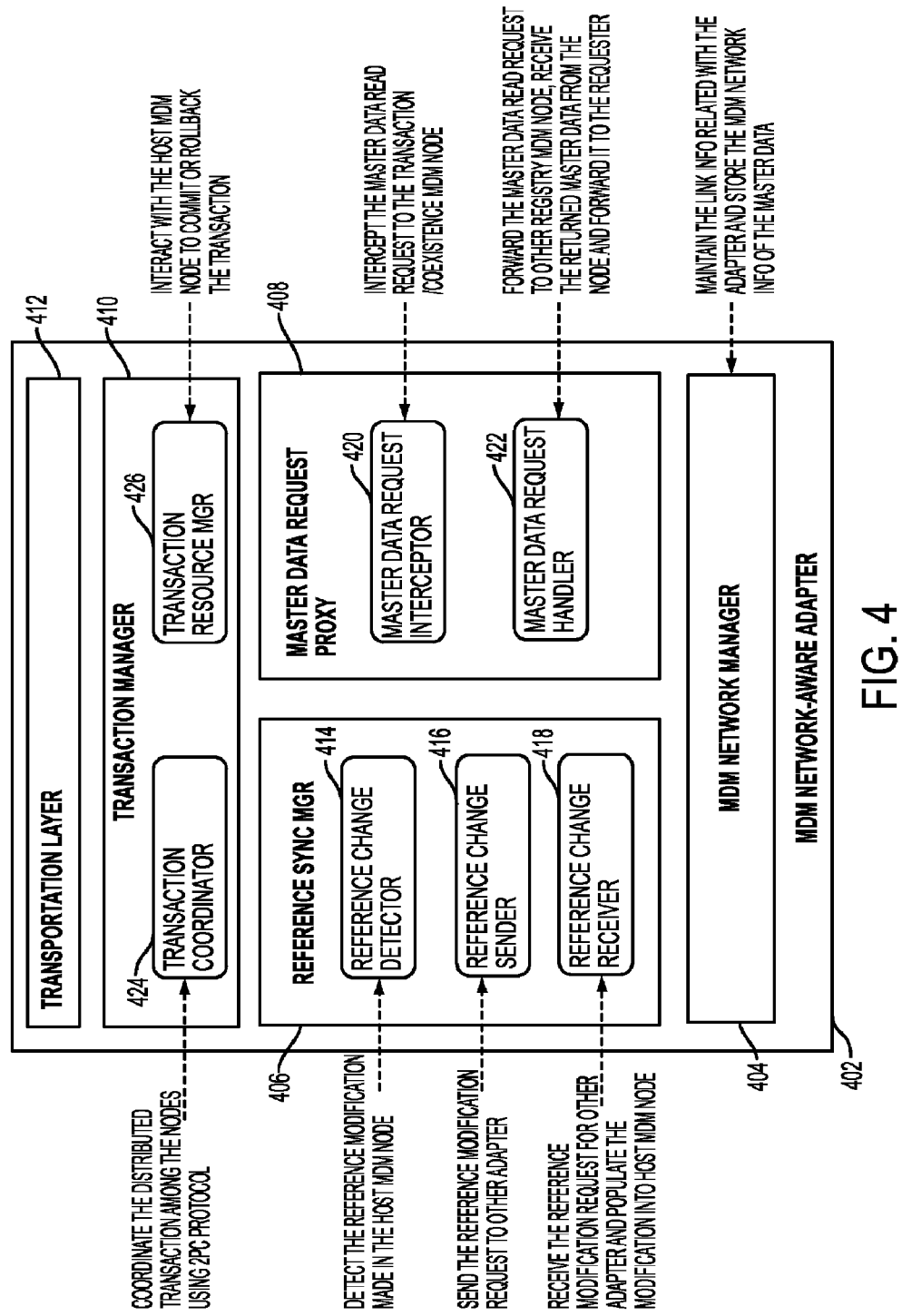
FIG. 4 is a diagram illustrating an MDM network-aware adapter of the present disclosure in one embodiment.

FIG. 4 is a diagram illustrating an MDM network-aware adapter of the present disclosure in one embodiment. In one embodiment of the present disclosure, an MDM network-aware adapter 402 resides with each MDM node or system. The MDM network-aware adapters talk to one another to establish one or more links between them and to synchronize the MDMs. Within an MDM node, the adapter 402 acts as an application, for example, for data objects implemented in registry style. The adapter 402 may also act as MDM storage, for example, for data objects implemented in co-existence or transaction style. To another adapter, the adapter 402 may act as an MDM server. The adapter 402 in one embodiment may include functionalities such as a MDM network manager 404, reference synchronization manager 406, master data request proxy 408, transaction manager 410 and transportation layer 412.

The MDM network manager 404 may maintain link information associated with the adapter 402 and store the MDM network information of the master data. Link information associated with the adapter 402 may include the topology information of the MDM network within which the adapter 402 functions, for example: which node the adapter 402 resides with; which adapters are linked with this adapter 402 and which nodes these adapters reside with, and the type of the links. The MDM network information of the master data may include the data distribution information and the architecture style information, for example: the architecture style of each node; and the data object instance list managed by each node.

The reference synchronization manager 406 may include a reference change detector functionality 414 that may detect the reference modification made in the host MDM node. The host MDM node refers to the MDM within which the adapter 402 resides or with which the adapter 402 is associated. The reference synchronization manager 406 may also include a reference change sender functionality 416 that may send the reference modification request to one or more other adapters associated with one or more of other MDM nodes. The reference synchronization manager 406 may further include a reference change receiver functionality 418 that may receive the reference modification request from one or more other adapters associated with one or more of other MDM nodes, and further populate the modification into the host MDM node. In this way, the reference synchronization manager 406 keeps track of what is modified in the host MDM and requests the same modification to be made in other MDMs, and further receives information about the modifications made in other MDMs and makes the same modifications in the host MDM node.

The master data request proxy 408 in one embodiment may include master data request interceptor functionality 420 that may intercept the master data read request to the transaction and coexistence style MDM nodes. The master data request proxy 408 in one embodiment also may include a master data request handler functionality 422 that may forward the master data read request to other one or more registry MDM nodes, receive the returned master data from the node and forward it to the requester.

The transaction manager 410 in one embodiment may include a transaction coordinator that may coordinate the distributed transaction among the nodes using two-phase commit (2PC) protocol, a type of atomic commitment protocol. The transaction manager 410 in one embodiment further may include a transaction resource manager functionality 426 that may interact with the host MDM node to commit or rollback the transaction.

The transportation layer 412 in one embodiment performs the transferring of the data between the MDM nodes. The transportation layer is in charge of transferring the data and the control information. For example, a hypertext t transfer protocol (http) layer or a WebSphere™ massage queue layer.

In one embodiment of the present disclosure, the MDM network-aware adapter 402 is configured to handle communications with different types of links, for instance, to support the communicating between and among MDM nodes that are implemented in different styles, for instance, registry style, co-existence style and transaction style, for example, by establishing the appropriate links.

Figure 5:
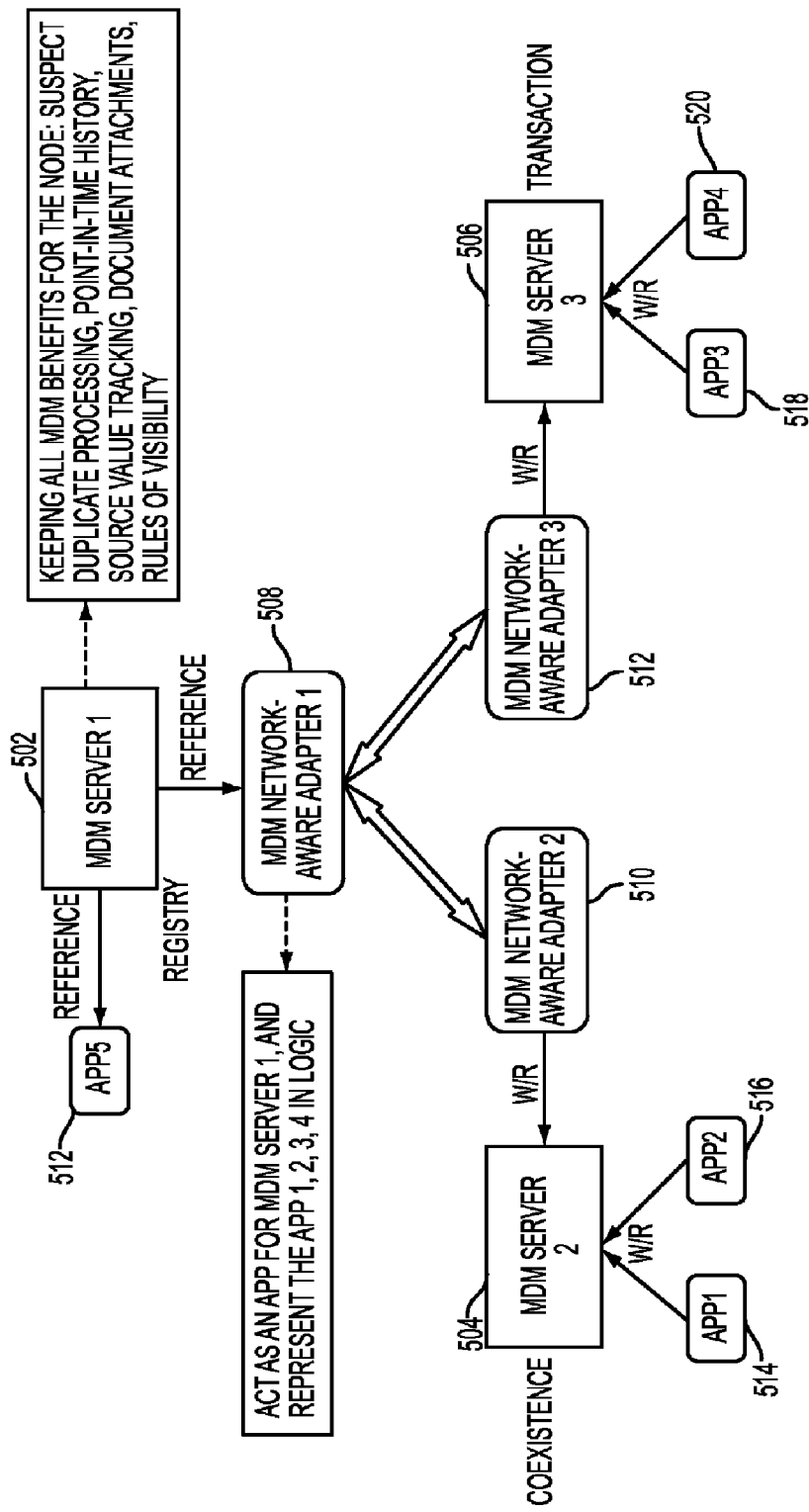
FIG. 5 illustrates an example of a network of MDM nodes with corresponding MDM network-aware adapters in one embodiment of the present disclosure.

FIG. 5 illustrates an example of a network of MDM nodes (502, 504, 506) with corresponding MDM network-aware adapters (508, 510, 512, respectively) in one embodiment of the present disclosure. Each MDM node may have one or more applications linking to it to access and handle the master data for that node. For instance, "APP5" 512 may link to "MDM Server 1" 502 for accessing (e.g., read and/or write) the master data on that node; "App1" 514 and "App2" 516 may link to "MDM Server 2" 504 for accessing data (e.g., read and/or write) the master data on that node; "App3" 518 and "App4" 520 may link to "MDM Server 3" 506 for accessing data (e.g., read and/or write) the master data on that node. An MDM network-aware adapter (e.g., 508) acts as an ordinary application to an MDM server (e.g., 502), which linked to it with the desired architecture style. An MDM network-aware adapter may also acts as an application to the MDM server, which logically may represent all the applications which are not directly linked with the node. For example, "MDM network-aware adapter 1" 508 may act as an application to "MDM Server 1" 502 that represents "App1" 514, "App2" 516, "App3" 518 or "App4" 520, or any combinations thereof. As a result, in one aspect, a new MDM node being added into a network of the MDM nodes, appear as if another application is added to an MDM node.

Figure 6:
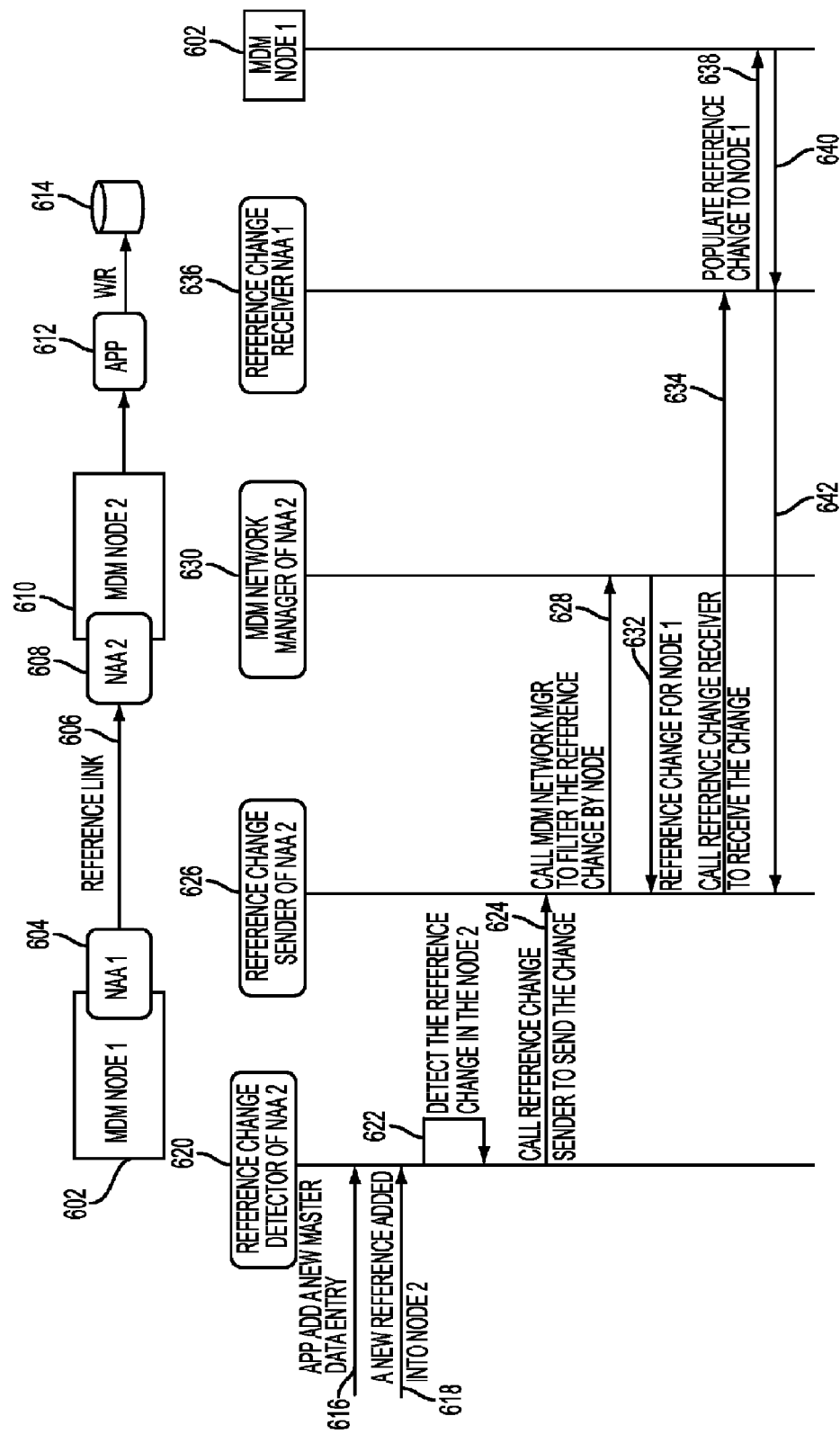
FIG. 6 is a diagram illustrating an MDM network-aware adapter handling a reference change notification on a reference link.

FIG. 6 is a diagram illustrating an MDM network-aware adapter handling a reference change notification on a reference link. In this example, MDMs are connected by a reference link. For instance, the network-aware adapter 604 of "MDM node 1" 602 is connected by a reference link 606 with the network-aware adapter 608 of "MDM node 2" 610. An application 612 connected to "MDM node 2" 610 accesses (reads and/or writes) to a storage or database 614. At 616, an application linked to "MDM node 2" 610 adds a new master data entry to "MDM node 2", for example to its database 614. As a result, at 618, a new reference is added into "MDM node 2" 610. A reference change detector functionality 620 of the adapter at "MDM node 2" 610 detects a reference change in the node at 622. At 624, the reference change detector functionality 620 calls a reference change sender functionality 626 to send the change. The reference change sender functionality 626, in turn, at 628 calls an MDM network manager 630 of the MDM network-aware adapter 608 of the node 610 to filter the reference change by node. In one embodiment, the MDM network manager 630 may filter the reference change by node, by performing a search in its storage for the topology information and data distribution information, and deciding to which node it should send the new master data information. For example, the information may be sent to only those nodes that use or access the data. For instance, if the data distribution information shows that this data type is not managed by MDM node 1 602, this data change is not sent to node 1. On the other hand, the MDM node 1 602 may be determined to be one of the nodes managing this data, in which case the new master data and/or reference information about the new master data is sent to that MDM node 1 602.

At 632, the MDM network manager 630 returns one or more nodes that need to receive the change, for instance, by looking up a database of links of nodes and data objects to determine which nodes also use or need to be synchronized with this changed reference. In this scenario, the MDM network manager 630 may return "MDM node 1" 602.

At 634, the reference change sender 626 calls a reference change receiver 636 of the MDM network-aware adapter 604 at "MDM node 1" 602, the node returned by the MDM network manager 630, with the reference change. At 638, the reference change receiver 636 of the MDM network-aware adapter at "MDM node 1" 602 populates (e.g., processes and stores) the reference change at "MDM node 1" 602 in MDM node 1. For example, MDM server 602 establishes a reference to the entry added in node 2 610. Note that this is not a normal reference, it is a "reference of reference" because of the entry added in node 2 (610) itself is also a reference.

At 640, "MDM node 1" 602 notifies its reference change receiver 636 of the update. In turn, at 642, the reference change receiver 636 notifies the reference change sender 626 of the MDM network-aware adapter at "MDM node 2" 610 of the status of the update.

Figure 7:
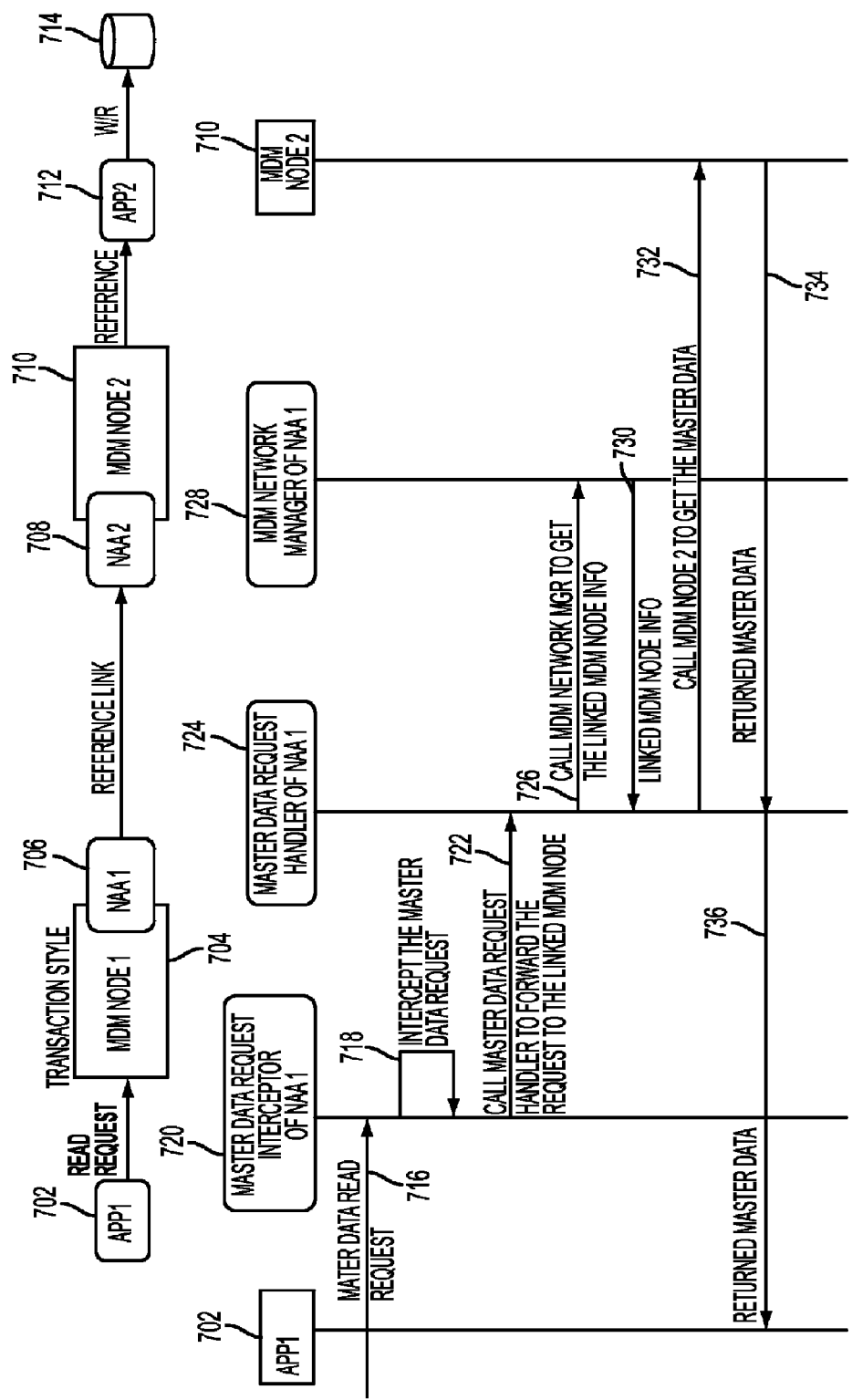
FIG. 7 illustrates a process of handling a read request forward on reference link by an MDM network-aware adapter in one embodiment of the present disclosure.

FIG. 7 illustrates a process of handling a read request forwarded on reference link by an MDM network-aware adapter in one embodiment of the present disclosure. In this example, an application (e.g., APP1) 702 linked to an MDM node (e.g., MDM node 1) 704 requests a read on a data object. Unlike the processing in the traditional transaction style node, in which the read request only invokes a query to the local storage for result, the methodology of the present disclosure as shown in FIG. 7 intercepts the request and distributes the request among the linked nodes.

At 716, an application 702 sends a master data read request to its MDM node. At 718, master data request interceptor functionality 720 of the adapter 706 associated with the MDM node 704 intercepts the master data request. At 722, the master data request interceptor functionality 720 of the adapter 706 associated with the MDM node 704 calls a master data request handler 724 of the adapter 706 associated with the MDM node 704 to forward the request to a linked MDM node. At 726, the master data request handler 724 of the adapter 706 associated with the MDM node 704 calls an MDM network manager 728 of the adapter 706 associated with the MDM node 704 to determine the linked MDM node information. At 730, the MDM network manager 728 returns the linked MDM node information. This information may be retrieved by looking up a database of linked nodes. At 732, the master data request handler 724 calls the linked MDM node returned by the MDM network manager 728, for example, MDM node 2 at 710, to get the master data. The called node 710 then returns the master data at 734 to the master data request handler 724. The master data request handler 724 returns the master data to the application 702 at 736.

Figure 8:
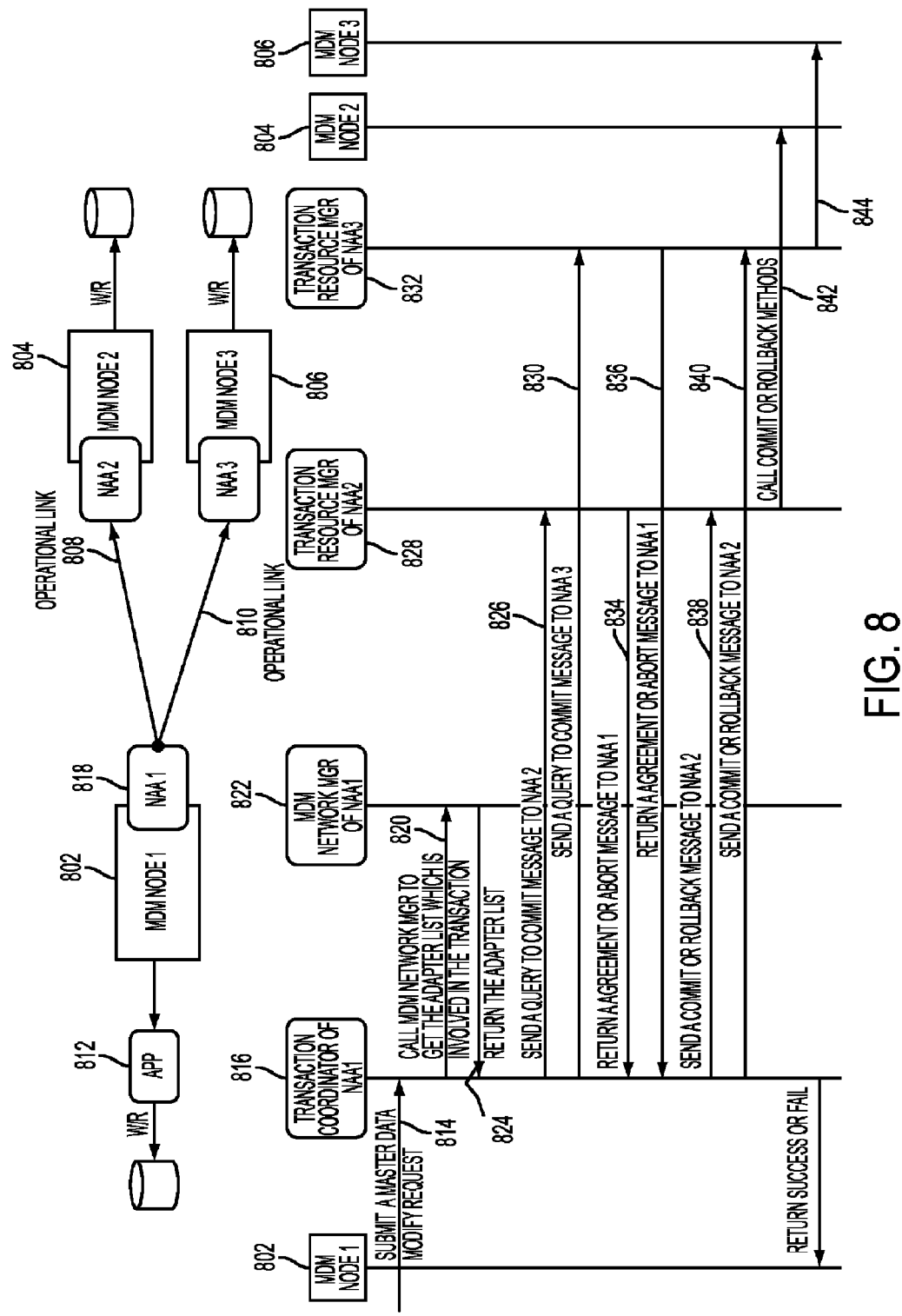
FIG. 8 illustrates a process of operational link in an MDM network-aware adapter in one embodiment of the present disclosure.

FIG. 8 illustrates a process of writing or reading a data request based on the operational link in an MDM network-aware adapter in one embodiment of the present disclosure. In this example, all three MDM nodes 802, 804, 806 are implemented in transaction style, and two operational links 808, 810 are established between node 1, node 2 and node 3 to form a MDM network. An application (e.g., APP) 812 linked to an MDM node (e.g., MDM node 1) 802 requests a modification on a data object. For example, at 814, the application 812 sends master data modification request to its MDM node 802. At 820, a transaction coordinator functionality 816 of the adapter 818 associated with the MDM node 1 (802) calls a MDM network manager functionality 822 to get the adapter list which is involved in the transaction. The MDM network manager 822 searches in its storage for the topology information and data distribution information, and retrieves the adapter list involved in the transaction. At 824, the MDM network manager 822 returns the adapter list to the transaction coordinator 816. The rest of the steps in this example may involve a two phase commit process. For instance, at 826, the transaction coordinator 816 of MDM node 1 (802) sends a message including the modification request to the transaction resource manager 828 of MDM node 2 (804) to confirm if the node 2 (804) is ready for committing a modification transaction; at 830, the transaction coordinator 816 of MDM node 1 (802) also sends a message to the transaction resource manager 832 of MDM node 3 (806) to confirm the readiness to commit a modification transaction. At 834, the resource manager 828 of MDM node 2 (804) returns an agreement or abort status to the transaction coordinator 816 of MDM node 1 (802). At 836, the resource manager 832 of MDM node 3 (806) also returns an agreement or abort status to the transaction coordinator 816 of MDM node 1 (802). If the returned status of node 2 and node 3 are both agreements, the transaction coordinator 816 of MDM node 1 (802) will send corresponding commit message to the resource managers 828, 832 of MDM node 2 and 3 at 838 and 840, and resource managers 828, 832 of MDM node 2 and 3 commit the transaction locally at 842 and 844. If the returned status of node 2 and node 3 are not both agreements, the transaction coordinator 816 of MDM node 1 sends corresponding rollback message to the resource managers 828, 832 of MDM node 2 and 3 at 838 and 840, and resource managers 828, 832 of MDM node 2 and 3 perform rollback the operations locally at 838 and 840, respectively. Then, at 842, the transaction coordinator 816 of MDM node 1 returns a message indicating success or failure of the master data modify request to the application 812 that requested the modification.

Figure 9:
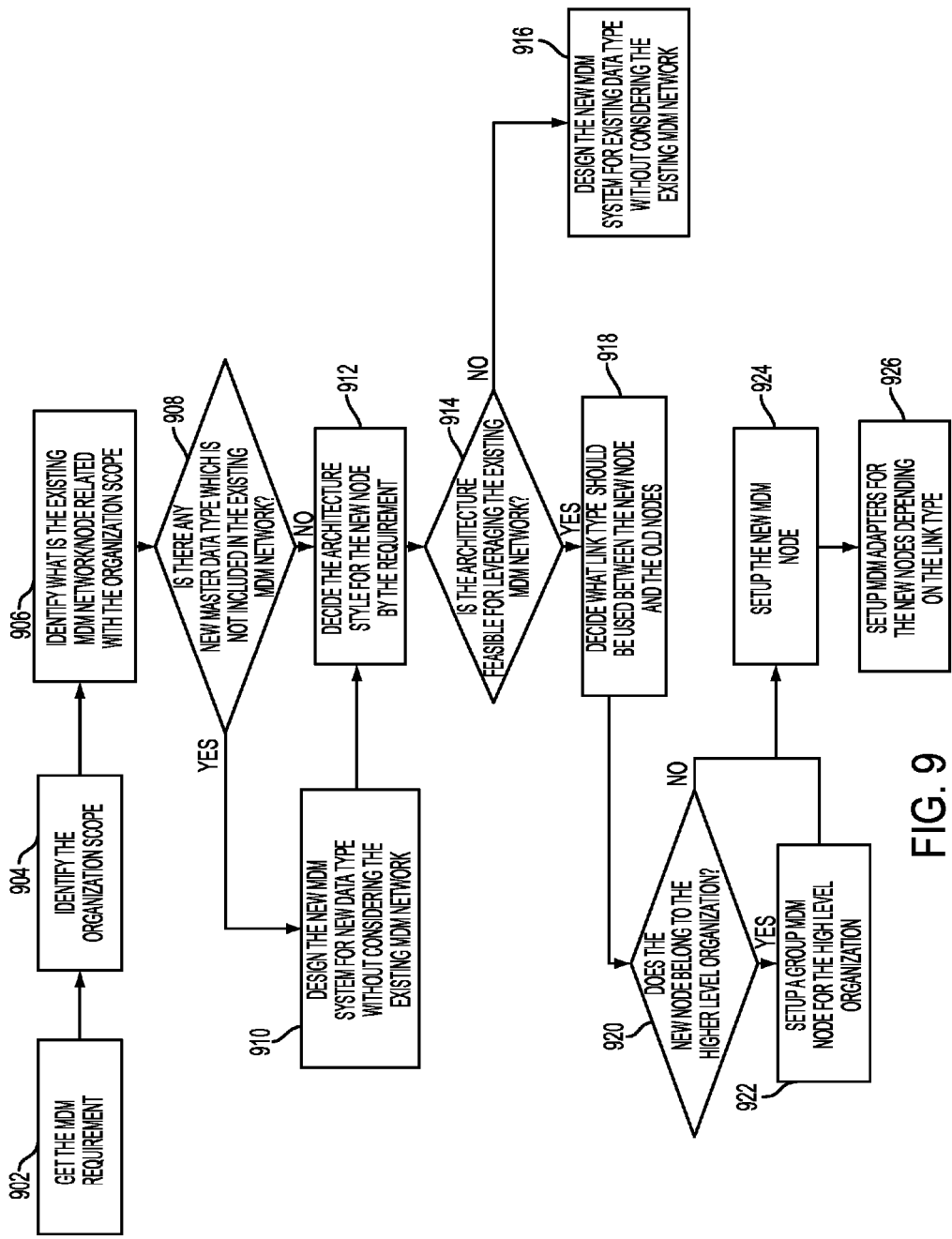
FIG. 9 illustrates a method of adding a new node to an existing network of MDM nodes.

In one embodiment of the present disclosure, an MDM network-aware adapter also enables for adding, modifying and removing an MDM. FIG. 9 illustrates a method of adding a new node to an existing network of MDM nodes. At 902, MDM requirement is obtained. The MDM requirement may include information about the MDM system and the data objects it manages, for instance, as specified by an entity (or customer) owning and using the data collected during the traditional MDM implement. Examples of such requirements may include what data types should be managed by the MDM system, what is the preferred architecture style of the MDM system, and other information.

At 904, the organization scope is identified. This step identifies what is the organization scope in which the new MDM system will be used, for example, under a multi-level organization. For example, when a new MDM system is introduced to the network of MDM system, for example, in a municipal context, it may be decided what government organizations will directly use this MDM system, for instance, a town's government, or a county's government and all the towns' governments which belongs to the county, or a city's government, or other government organizations, or any combinations thereof.

At 906, the existing MDM network (network of MDM nodes) related with the organization scope is identified. For instance, when adding a new MDM system for a specific organization scope, this step finds the MDM network to which the new MDM system should be added. Because of the organization structure most likely reflects the relationship of different MDM systems, the method of the present disclosure may find the existing MDM system or MDM network in the upper level or lower level organization of the identified organization scope.

At 908, it is determined whether there is any new master data type which is not included in the existing MDM network or nodes. At 902, the master data types that will be managed in the new MDM system were determined. In addition, the list of the master data types already managed by the existing one or more MDM nodes may be determined from the configuration information of the one or more MDM nodes. The master data types to be managed by the new MDM system and those that are already managed by the existing one or more MDM systems may be compared to determine if there are new data types in the new MDM system, which are not managed by the existing MDM systems. For example, the new MDM system may manage "Product, Citizen, Parcel", and there are two existing MDM nodes which are managing "Product" and "Party, Parcel" respectively. In this example, the new data type "Citizen" is identified or discovered.

Because the architecture style of the new data types, will not affect other existing MDM nodes since the existing MDM nodes have not used the data, the design of the architecture style for the new data types need not consider the existing MDM network as shown at 910.

For existing data types at 912, because the architecture style will affect and be constrained by the other existing MDM nodes, the design of the architecture style in one embodiment of the present disclosure depends on the requirement of the new node as well as the consideration as to whether the one or more of the new data types' architecture style would be feasible in light of the other existing nodes. If it not feasible, the architecture style of one or more new data types may be changed to a feasible one. At 910, if there are no new master data types, the architecture style for the new node to be added is decided using the MDM requirement obtained at 902. At 912, if there is one or more new master data types, a new MDM system for new data type is designed without considering the existing MDM network.

At 914, it is determined whether the architecture style for new data types in the new MDM system is feasible for leveraging the existing MDM network. For example, a map or chart of which architecture style is compatible or feasible may be stored in memory and accessed to determine the feasibility. The following is an example of such map which shows that new nodes that are implemented in transaction or coexistence style are not compatible with existing nodes that are implemented in registry style.

|  |  | Architecture style of an existing MDM node | | |
| --- | --- | --- | --- | --- |
|  |  | Registry | Coexistence | Registry |
| Architecture style of newly added MDM node | Transaction | Infeasible | Feasible | Feasible |
|  | Coexistence | Infeasible | Feasible | Feasible |
|  | Registry | Feasible | Feasible | Feasible |

At 916, if it is determined that the architecture is not feasible for leveraging the existing MDM network, a new MDM system is designed for existing data type without considering the existing MDM network. In this case, the new MDM node cannot be added into the existing the MDM network, for instance, if the designer insists on the architecture style which is infeasible (or incompatible) for use with the existing MDM network. The new MDM node may be designed alone without considering the existing MDM network.

At 918, if it is determined that the architecture is feasible for leveraging the existing MDM network, the link type is decided for use between the new node and the existing nodes. Link type may be determined based on the architecture style of the new node. For example if a feasible register style has been decided for the new node, and the new node should hold a logical holistic view for the master data within the organization without having to modifying the existing nodes. By establishing proper links between a new node and existing nodes, the user of the new node is enabled to see a holistic view for the master data of his organization even though some of the real data physically reside in the existing nodes.

Table 1 explains what links should be established when a new node that is implemented in registry style is added to a network of MDMs. For example, if the architecture style of an existing node with which the new node should link is Registry, and if the user or application who will use the new node may modify the data (not read only), then the link between the new node and the existing node should be Bi-direction Reference link (one reference link from the new node to the existing node, and another reference link from the existing node to the new node). If the architecture style of the existing node with which the new node should link is Registry, and if the user or application that will use the new node can access the data as read only, then the link should be one reference link from the new node to the existing node. Other cells in this table provide similar explanation. The "Coexistence" and "Transaction" column in Table 1 may be interpreted similarly.

TABLE 1

| Architecture style of an existing node | Registry | Coexistence | Transaction |
|---|---|---|---|
| The application linked directly to the new node will modify the master data | Bi-direction Reference link between the new node and an existing node | Bi-direction Reference link between the new node and an existing node | Bi-direction Reference link between the new node and an existing node |
| The application linked directly to the new node will not modify the master data | Reference link from the new node to an existing node | Reference link from the new node to an existing node | Reference link from the new node to an existing node |

Figure 10A:
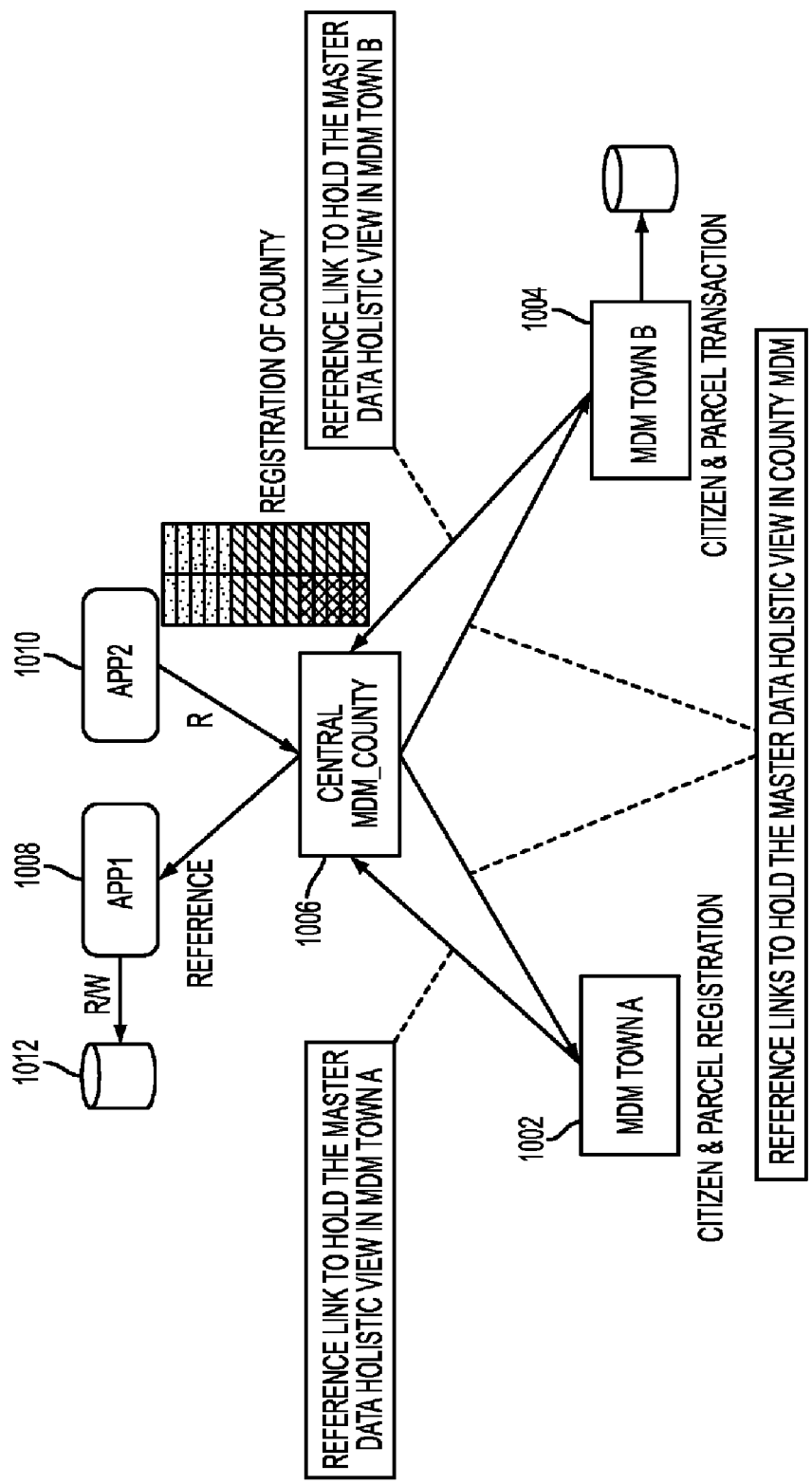
FIGS. 10A, 10B and 10C illustrate deciding on what types of links to establish when adding a new MDM node.

FIG. 10A illustrates what links should be established if a new node's architecture style is registry style. FIG. 10A shows an example MDM network with two existing MDM nodes. MDM node of Town A 1002 manages two data types for town A, Citizen and Parcel. These two data types are managed in a registry style. MDM node of Town B 1004 manages two data types for town B, Citizen and Parcel. These two data types are managed in a transaction style. One new incoming MDM node, for example, MDM node for County 1004 is designed to be registry style by customer specified (or other designer specified) requirement. In this example, two applications 1008, 1010 will directly use this MDM node 1006. App1 (1008) has its local data storage 1012 and will read and/or write data from the local storage 1012, app2 (1010) has no local data and will only read data from this MDM node 1006. Because the new MDM node 1006 is used in the county level, this node 1006 may be configured to supply a logical holistic view for the master data within the county. That is, from this MDM node 1006, an application should be able to read Parcel and Citizen information, which belongs to the county including those in towns A and B. To accomplish this, in one embodiment of the present disclosure, the methodologies of the present disclosure may leverage the existing MDM nodes of town A and town B 1002, 1004, without modifying them, for instance, by establishing links between the new node and existing nodes based on the table 1. Referring to Table 1, since the new node will be registry style and the app1 (1008) using this node 1006 will modify the master data, registry links may be established from the new node 1006 to the existing nodes 1002, 1004, and also the reverse links from existing nodes 1002, 1004, to the new node 1006.

Figure 10B:
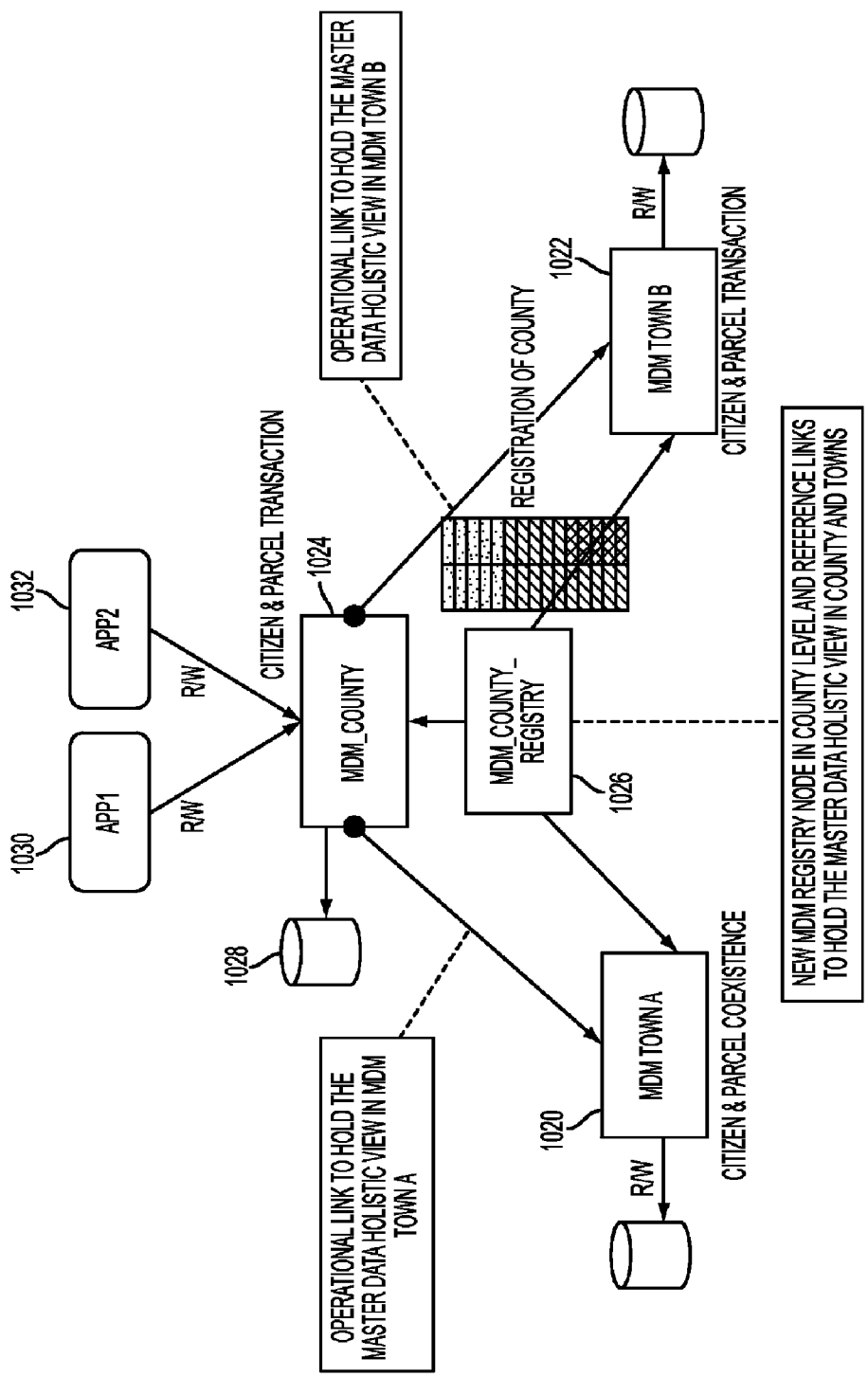

FIG. 10B illustrates an example of leveraging Table 2 to determine what links should be established if a new node's architecture style is transaction style. FIG. 10B shows an example MDM network with two existing MDM nodes. MDM node for Town A 1020 manages two data types for town A, Citizen and Parcel. These two data types are managed in a coexistence style. MDM node for Town B 1022 manages two data types for town B, Citizen and Parcel. These two data types are managed in a transaction style. Two new MDM nodes, MDM_County and MDM_County_Registry nodes are added to the network. MDM_County node 1024 is designed to be transaction style by its implementation requirement, for instance, following a customer or other design specification. As transaction style, this node 1024 has local storage 1028 on the MDM node 1024. Two applications 1030, 1032 will directly use this MDM node 1024, and will write data on this MDM node 1024. A write request from app1 (1030) or app2 (1032) can include writing data which are managed by MDM node of Town A 1020 or MDM node of Town B 1022. The methodology of the present disclosure leverages the existing MDM nodes 1020, 1022 to support this functionality without modifying those nodes 1020, 1022, for instance, by establishing links between the new node 1024 and existing nodes 1020, 1022 based on Table 2.

Referring to Table 2, since the existing nodes 1020, 1022, are coexistence and transaction style respectively, operational links may be established from the new node 1024 to MDM node of Town A 1020 and MDM node of Town B 1022.

FIG. 10B shows another new node 1026 added to the MDM network. For instance, if it is desired to supply a read only logical view for the master data within the county so that an application can read data managed by lower-level organizations (e.g., town A and town B), a new node may be created and added. MDM_County_Registry node 1026, for example, may be created at a county level node and added to the network. This node 1026 may be implemented in registry style and have a reference link from this node 1026 to other three MDM nodes 1020, 1022, 1024.

The second row of Table 2 specifies a link type when a new transaction MDM node is added in to a MDM network based on existing node's architecture style. The third row of Table 2 specifies a link type when an extra registry style MDM node (e.g., 1026 in FIG. 10B) is added which is accompanied with the above new transaction MDM node (e.g., 1024 in FIG. 10B).

TABLE 2

| Architecture style of existing node | Coexistence | Transaction |
|---|---|---|
| Link between a new node and an existing node | Operational link from new node to existing node | Operational link from new node to existing node |
| Link between a registry style MDM node and other nodes | Reference link from a new node to an existing node | Reference link from a new node to an existing node |

Figure 10C:
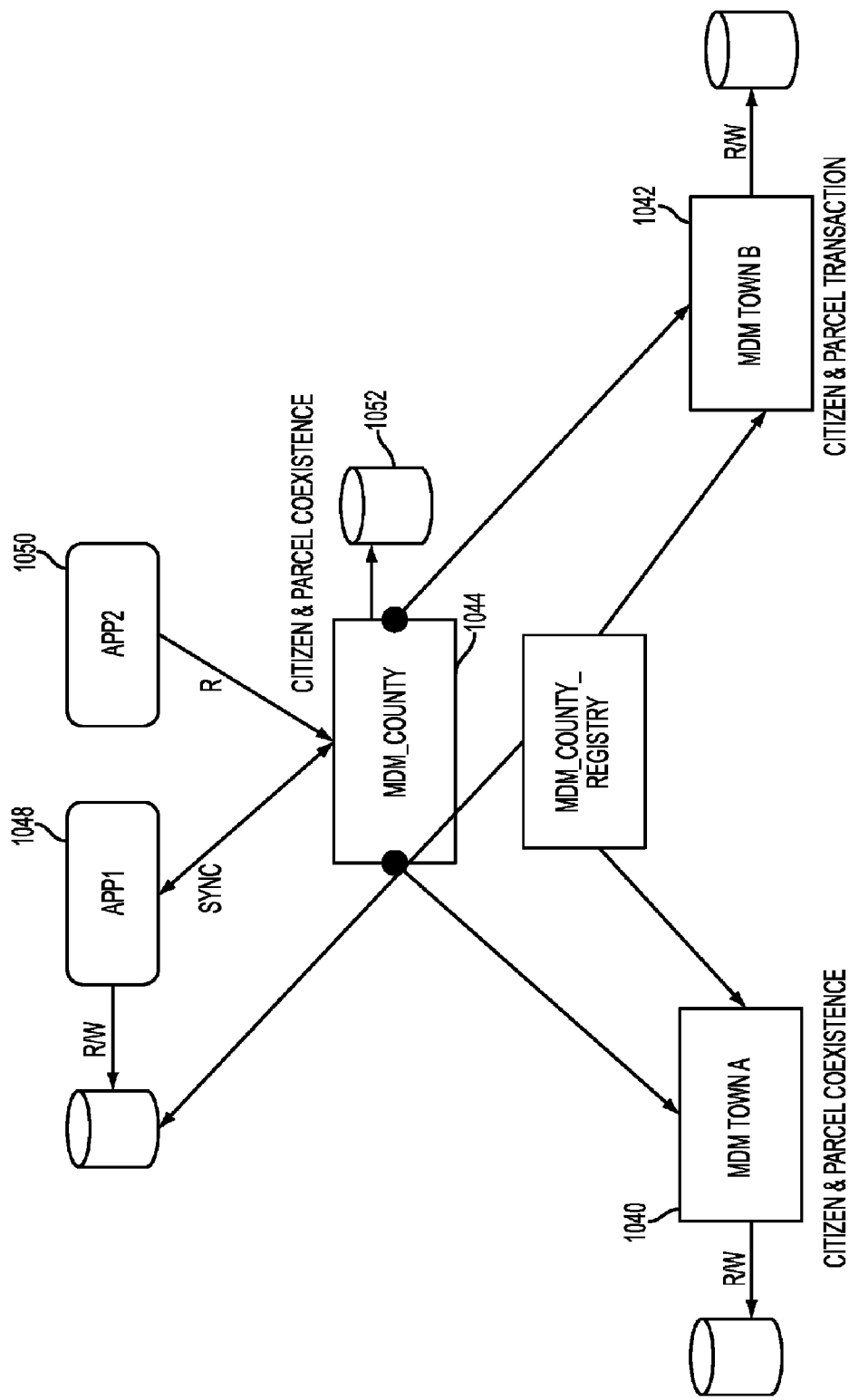

FIG. 10C illustrates determining and establishing links for a new node implemented in coexistence style of architecture. Establishing links for a new node implemented in coexistence style is similar to establishing links for a new node implemented in transaction style shown in FIG. 10B and Table 2. The difference is in the ability to directly link an application to an extra registry style node. For instance, when establishing a reference link from the new extra registry style node to the new coexistence style node, the link could actually points to the application associated with the coexistence node. This is because in the coexistence style, the data residing with the application is the system of record, and when the extra registry style node is added accompanied with the new coexistence style node, the new coexistence style node can be bypassed to directly link to the application, e.g., without needing to use the coexistence node as the intermediary.

FIG. 10C shows an example MDM network with two existing MDM nodes 1040, 1042. MDM node for Town A 1040 manages two data types for town A, Citizen and Parcel. These two data types are managed in a coexistence style. MDM node for Town B 1042 manages two data types for town B, Citizen and Parcel. These two data types are managed in a transaction style. Two new MDM nodes, MDM_County and MDM_County_Registry nodes are added to the network. MDM_County node 1044 is designed to be coexistence style by its implementation requirement, for instance, following a customer or other design specification. As coexistence style, this node 1044 has local storage 1052 on the MDM node 1044 that stores synchronized data. Two applications 1048, 1050 will directly use this MDM node 1044. A synchronization request from app1 (1040) or a read request for app2 (1032) can include synchronizing or reading the data which are managed by MDM node of Town A 1040 or MDM node of Town B 1042. The methodology of the present disclosure leverages the existing MDM nodes 1040, 1042 to support this functionality without modifying those nodes 1040, 1042, for instance, by establishing links between the new node 1044 and existing nodes 1040, 1042 based on Table 3.

TABLE 3

| Architecture style of existing node | Coexistence | Transaction |
|---|---|---|
| Link between a new node and an existing node | Operational link from a new node to an existing node | Operational link from a new node to an existing node |
| Link between a registry style MDM node and other nodes | Reference link from a new node to an existing node In this case, a reference link actually points to the application linked with the coexistence node | Reference link from a new node to an existing node |

Referring to Table 3, since the existing nodes 1040, 1042, are coexistence and transaction styles respectively, operational links may be established from the new node 1024 to MDM node of Town A 1040 and MDM node of Town B 1042.

FIG. 10C shows another new node 1046 added to the MDM network. For instance, if it is desired to supply a read only logical view for the master data within the county so that an application can read data managed by lower-level organizations (e.g., town A and town B), a new node may be created and added. MDM_County_Registry node 1046, for example, may be created at a county level node and added to the network. This node 1046 may be implemented in registry style and have a reference link from this node 1046 to the child level MDM nodes 1040, 1042.

The second row of Table 3 specifies a link type when a new coexistence style MDM node is added in to a MDM network based on existing node's architecture style. The third row of Table 3 specifies a link type when an extra registry style MDM node (e.g., 1046 in FIG. 10C) is added which is accompanied with the above new coexistence MDM node (e.g., 1044 in FIG. 10C).

MDM nodes linked according to one embodiment of the present disclosure can differentiate which master data to be transmitted through a specific link. When a "reference of reference" is established through reference link, a low level reference change may be notified to the high level reference. A read request may be forwarded to a transaction and coexistence style node to a registry node. MDM nodes can also handle distributed transaction when using an operational link.

Referring back to FIG. 9, at 920, it is determined whether the new node belongs to a higher level organization, for example, higher in the hierarchy than the existing MDM nodes in the network. For instance, organizations may be structured into a hierarchy of organizations or entities. A county government is considered a higher level compared to a town government, for instance, since the county includes the towns. For example, if a town's government which belongs to a county is using MDM systems, and now the county's government is developing a MDM system, then the new MDM node belongs to a higher level organization, i.e., county government.

At 922, if the new node belongs to a higher level organization, a group MDM node is setup for the higher level organization. Group MDM node is described in co-owned patent applications entitled "Federation of Multi-level Master Data Management Systems" Ser. No. 13/117,370 and "Data Stewardship in Federated Multi-level Master Data Management Systems" Ser. No. 13/117,411, which applications are incorporated herein by reference in their entirety.

At 924, the new MDM node is setup, which may include data model development, data cleaning, application side coding, software installation, testing, and others. At 926, an MDM adapter is setup for the new node, for instance, depending on the link type.

Setting up the MDM adapter may include preparing the MDM network information, installing the adapter, configuring the adapter based on the MDM network information, and the link types.

Figure 11:
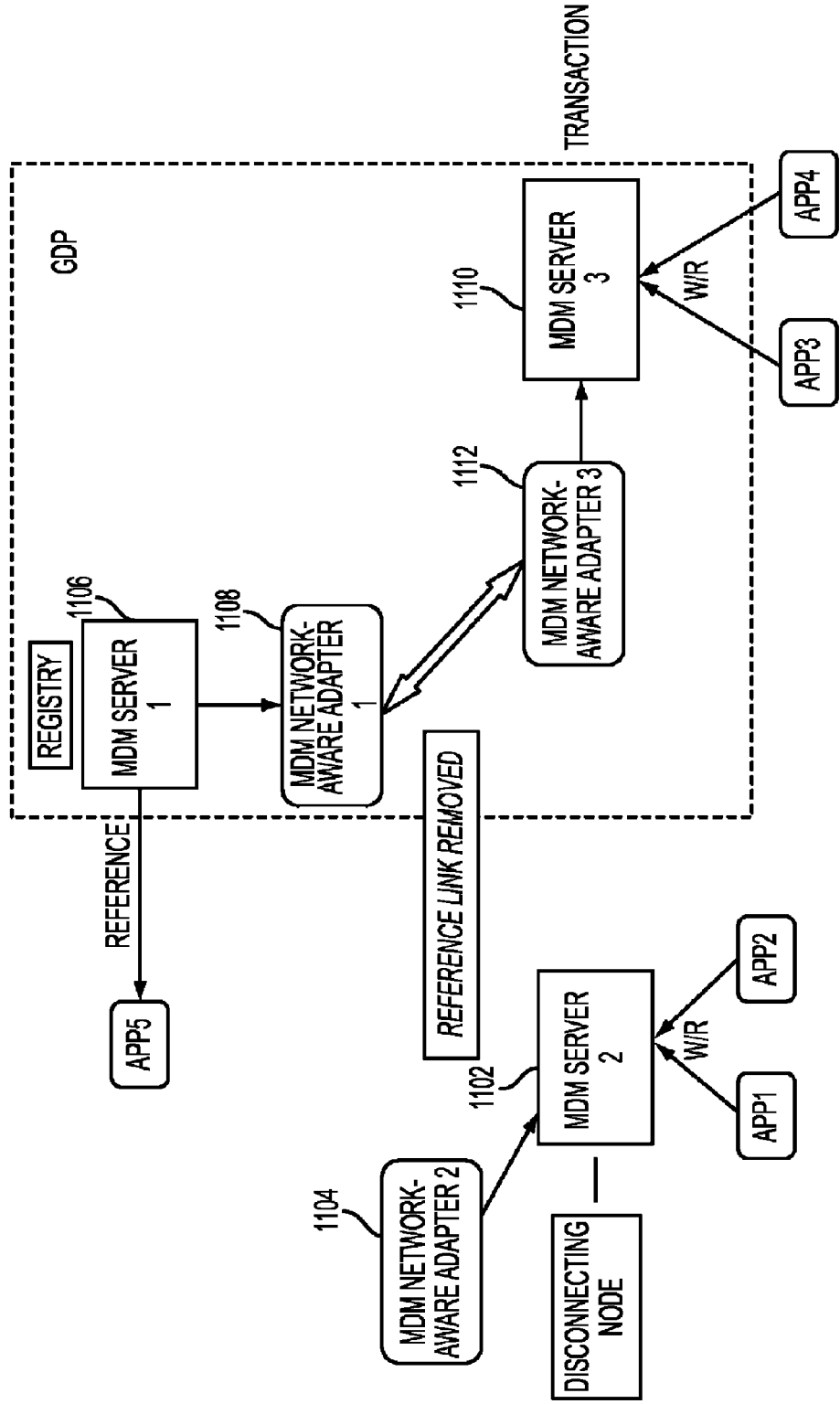
FIG. 11 is a diagram illustrating a process of removing a link between different MDM nodes with a reference or operational link from a disconnecting node.

FIG. 11 is a diagram illustrating a process of removing a link between different MDM nodes with a reference or operational link from a disconnecting node. If a node that is being removed has reference link, the following steps may be employed. A MDM Network-Aware Adapter 2 (1104) determines the existing connections between the disconnecting node (i.e., one that is being removed) 1102 and all other nodes 1106, 1110. The MDM network-aware adapter 1104 of the disconnecting node 1102 and the other nodes 1106, 1110 are notified of disconnection attempt. For example, the MDM network manager of the disconnecting node's MDM network-aware adapter 1104 notifies the MDM network-aware adapters 1108, 1112 of the nodes 1108, 1112 about the intention to disconnect (or remove). The MDM network-aware adapters 1108, 1112 of the nodes 1108, 1112, each severs links. For instance, the MDM network managers of the remaining nodes' MDM network-aware adapters 1108, 1112 transmit a request to all the components in the node and remove references to the disconnecting node. For instance, a message may be sent to all the components in the system, which components may perform appropriate clean up work. For example, the MDM network manager component may update its network information; the MDM server may remove the reference information. The MDM network manager of the disconnecting node 1102 removes the references to all other nodes. The system no longer recognizes applications or data associated with the disconnected node. The data from end node was only stored as reference, therefore no additional work is needed.

If the disconnecting node has operational link, the following steps may be taken to disconnect (remove) that node from the network of MDM nodes. The system determines the existing connections between the disconnecting node 1102 and all other nodes 1106, 1110. The MDM network-aware adapter 1104 of the disconnecting node 1102 and the other nodes 1106, 1110 are notified of disconnection attempt. The MDM network-aware adapter 1108, 1112 of each node removes the links. For instance, the remaining MDM system removes setting to update transactional details with the disconnected node 1102. The system no longer recognizes applications or data associated with the disconnected node. Previously stored master data to/from the disconnected node remains. The remaining MDM system will no longer receive transaction updates from the disconnecting node. The remaining MDM system can keep stale data and maintain record of the disconnection date or date of the last transactions. Otherwise, the remaining MDM system may delete all data associated with the disconnected node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for federating master data management systems, comprising:
    a network-aware adapter configured with a host master data management node, the network-aware adapter including at least:
    a network manager operable to maintain link information associated with the network-aware adapter and store master data management network information associated with the host master data management node;
    a transaction coordinator operable to coordinate distributed transaction between the host master data management node and one or more of second master data management systems;

a transaction resource manager operable to interact with the host master data management node to commit or rollback a transaction;

a reference change detector operable to detect a reference modification made in the host master data management node;

a reference change sender operable to send a reference modification request to one or more of the second master data management systems;

a reference change receiver operable to receive the reference modification request from one or more of the second master data management systems and populate the modification into the host master data management node;

a master data request interceptor operable to intercept a master data read request made to the host master data management node; and a master data request handler operable to forward the master data read request to one or more of the second master data management systems that are implemented in registry style, and receive in response returned master data from said one or more of the second master data management systems that are implemented in registry style node, and further forward the returned master data to a requestor.

2. The system of claim 1, wherein the network-aware adapter is configured to support a plurality of types of links for communicating with one or more of the second master data management systems.

3. The system of claim 2, wherein the plurality of types of links includes registry, transaction and coexistence styles of links.

4. The system of claim 1, wherein the link information includes topology information associated with a network of master data management systems that includes the host master data management node and one or more of the second master data management systems.

5. The system of claim 4, wherein the topology information includes identifier of the host master data management node, one or more identifiers of one or more of the second master data management systems and their respective network-aware adapters to which the network-aware adapter configured with the host master data management node links.

6. The system of claim 1, wherein the network-aware adapter is further operable to establish a communication link type to and from a new master data management node being added to a network of master data management systems, of which the host master data management system is a member, the communication link type established based on implementation style of the host master data management node and implementation style of the new master data management system being added.

7. The system of claim 6, wherein the network-aware adapter further determines that a communication link is infeasible if the host master data management node is implemented in registry style and the new master data management node is implemented in transaction or coexistence style.

8. The system of claim 6, wherein if the new master data management node is implemented in registry style and an application linked directly to the new master data management node is enable to modify master data, bi-direction reference type link is established between the new master data management node and the host master data management node, and if the application is not enabled to modify the master data, a reference link from the new master data management node to the host master data management node is established.

9. The system of claim 6, wherein if the new master data management node is implemented in transactional hub style or coexistence style, and if the host master data management node is implemented in coexistence or transactional hub style, an operational type link from the new master data management node to the host master data management node is established.

10. The system of claim 1, wherein the second master data management systems each includes a network-aware adapter.

11. A method of federating master data management systems, comprising:

maintaining link information associated with a network-aware adapter and storing master data management network information associated with a host master data management node;

coordinating distributed transaction between the host master data management node and one or more of second master data management systems in a network of master data management systems;

interacting with the host master data management node to commit or rollback a transaction;

detecting a reference modification made in the host master data management node;

sending a reference modification request to one or more of the second master data management systems;

receiving the reference modification request from one or more of the second master data management systems and populating the modification into the host master data management node;

intercepting a master data read request made to the host master data management node;

and forwarding the master data read request to one or more of the second master data management systems that are implemented in registry style, and receiving in response returned master data from said one or more of the second master data management systems that are implemented in registry style node, and further forwarding the returned master data to a requestor application.

12. The method of claim 11, further including supporting a plurality of types of links for communicating with one or more of the second master data management systems.

13. The method of claim 12, wherein the plurality of types of links includes registry, transaction and coexistence styles of links.

14. The method of claim 11, wherein the link information includes topology information associated with a network of master data management systems that includes the host master data management node and one or more of the second master data management systems.

15. The method of claim 14, wherein the topology information includes identifier of the host master data management node, one or more identifiers of one or more of the second master data management systems and their respective network-aware adapters to which an network-aware adapter configured with the host master data management node links.

16. The method of claim 11, further including establishing a communication link type, to and from a new master data management node being added to a network of master data management systems, of which the host master data management system is a member, the communication link type established based on implementation style of the host master data management node and implementation style of the new master data management system being added.

17. The method of claim 16, further including determining that a communication link is infeasible if the host master data management node is implemented in registry style and the new master data management node is implemented in transaction or coexistence style.

18. The method of claim 16, wherein if the new master data management node is implemented in registry style and an application linked directly to the new master data management node is enable to modify master data, bi-direction reference type link is established between the new master data management node and the host master data management node, and
if the application is not enabled to modify the master data, a reference link from the new master data management node to the host master data management node is established.

19. The method of claim 16, wherein if the new master data management node is implemented in transactional hub style or coexistence style, and if the host master data management node is implemented in coexistence or transactional hub style, an operational type link from the new master data management node to the host master data management node is established.

20. A non-transitory computer readable storage medium storing a program of instructions executable by a machine to perform a method of federating master data management systems, comprising:
maintaining link information associated with a network-aware adapter and storing master data management network information associated with a host master data management node;
coordinating distributed transaction between the host master data management node and one or more of second master data management systems in a network of master data management systems;
interacting with the host master data management node to commit or rollback a transaction;
detecting a reference modification made in the host master data management node;
sending a reference modification request to one or more of the second master data management systems;
receiving the reference modification request from one or more of the second master data management systems and populating the modification into the host master data management node;
intercepting a master data read request made to the host master data management node; and
forwarding the master data read request to one or more of the second master data management systems that are implemented in registry style, and receiving in response returned master data from said one or more of the second master data management systems that are implemented in registry style node, and further forwarding the returned master data to a requestor application.

21. The non-transitory computer readable storage medium of claim 20, further including supporting a plurality of types of links for communicating with one or more of the second master data management systems.

22. The non-transitory computer readable storage medium of claim 21, wherein the plurality of types of links includes registry, transaction and coexistence styles of links.

23. The non-transitory computer readable storage medium of claim 20, wherein the link information includes topology information associated with a network of master data management systems that includes the host master data management node and one or more of the second master data management systems.

24. The non-transitory computer readable storage medium of claim 23, wherein the topology information includes identifier of the host master data management node, one or more identifiers of one or more of the second master data management systems and their respective network-aware adapters to which an network-aware adapter configured with the host master data management node links.

25. The non-transitory computer readable storage medium of claim 20, further including establishing a communication link type, to and from a new master data management node being added to a network of master data management systems, of which the host master data management system is a member, the communication link type established based on implementation style of the host master data management node and implementation style of the new master data management system being added.

* * * * *